(12) United States Patent
Li et al.

(10) Patent No.: US 11,114,911 B2
(45) Date of Patent: Sep. 7, 2021

(54) BRUSHLESS MOTOR AND STATOR THEREOF

(71) Applicant: Shenzhen Tuowei Automotive Tech Co., Ltd., Shenzhen (CN)

(72) Inventors: Yongbin Li, Guangdong (CN); Xinping Wang, Guangdong (CN); Guowei Zhong, Guangdong (CN)

(73) Assignee: Shenzhen Tuowei Automotive Tech Co., Ltd., Shenzhen (CN)

(*) Notice: Subject to any disclaimer, the term of this patent is extended or adjusted under 35 U.S.C. 154(b) by 204 days.

(21) Appl. No.: 16/452,638

(22) Filed: Jun. 26, 2019

(65) Prior Publication Data
US 2020/0028398 A1     Jan. 23, 2020

(30) Foreign Application Priority Data
Jun. 30, 2018  (CN) .......................... 201810701721.3

(51) Int. Cl.
| | |
|---|---|
| *H02K 3/28* | (2006.01) |
| *H02K 1/16* | (2006.01) |
| *H02K 3/12* | (2006.01) |
| *H02K 3/48* | (2006.01) |
| *H02K 3/50* | (2006.01) |

(52) U.S. Cl.
CPC ............... *H02K 3/28* (2013.01); *H02K 1/165* (2013.01); *H02K 3/12* (2013.01); *H02K 3/48* (2013.01); *H02K 3/50* (2013.01)

(58) Field of Classification Search
CPC ............. H02K 3/28; H02K 3/522; H02K 3/18
See application file for complete search history.

(56) References Cited

U.S. PATENT DOCUMENTS

| | | | | |
|---|---|---|---|---|
| 5,006,745 A * | 4/1991 | Nishio | .................... | H02K 21/22 310/177 |
| 6,011,339 A * | 1/2000 | Kawakami | ............. | H02K 1/278 310/208 |
| 8,143,752 B2 * | 3/2012 | Altindis | ................. | H02K 3/522 310/71 |

FOREIGN PATENT DOCUMENTS

CN    201620406271.1    12/2016

* cited by examiner

*Primary Examiner* — Dang D Le
(74) *Attorney, Agent, or Firm* — Andrew C. Cheng (57) ABSTRACT

A stator of a brushless motor includes a stator core including a plurality of teeth arranged in a circumferential direction thereof, a slot being formed between any adjacent two teeth; and a plurality of phases of windings wound on the teeth and received in the corresponding slots. Each phase of winding includes two leading terminals, adjacent leading terminals of any adjacent two phases of windings extending out of the same slot, which simplifies the winding structure of the stator winding and reduces the short circuit risk between turns of coils of the winding. The windings can be formed by winding a single conductive wire uninterruptedly on the stator teeth. It is easily automated.

11 Claims, 6 Drawing Sheets

BRUSHLESS MOTOR AND STATOR THEREOF

CROSS-REFERENCE TO RELATED APPLICATION

This application claims priority under 35 U.S.C. 119 to China Patent Application No. 201810701721.3, filed on Jun. 30, 2018, which is hereby incorporated by reference in its entirety.

TECHNICAL FIELD

The present invention relates to the field of motor technology, and more particularly to a brushless motor stator and a brushless motor.

BACKGROUND

In the automotive motors with low voltage and small-power industrial motors, brushless motors with 12 slots have been widely used. Brushless motors with 12 slots and 8 poles are very popular. Brushless motors of which the number of the rotor poles is near to the number of the slots, such as a brushless motor with 12-slot and 10-pole and a brushless motor with 12-slot and 14-pole, have advantage of small self-positioning torque, high winding coefficient, good sine wave character, high positioning precision and the like, and therefore are obtaining more and more attention, especially in the field of automotive motors with low voltage. The motor adopts a segmented-type stator core in order to improve the force energy index of the motor. However, segmented-type stator core increases the complexity of the manufacturing process of the motor, in particular for a brushless motor with an outer diameter of less than 100 mm. Therefore, how to improve the manufacturing capability of a 12-slot near-pole brushless motor is important for product popularization.

Figure 1:
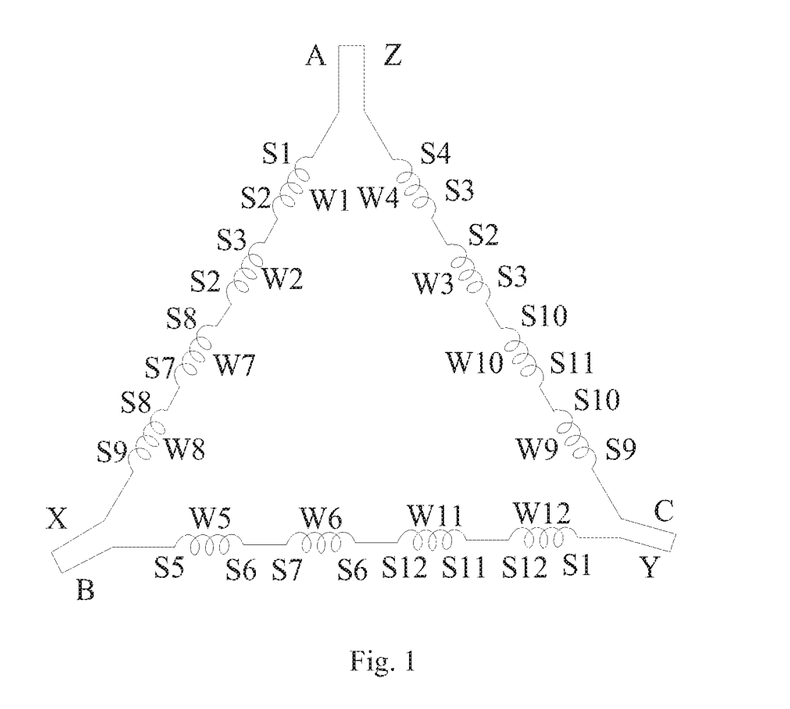
FIG. 1 is a schematic view of a winding diagram of a traditional brushless motor with 12 slots and 14 poles.
Figure 2:
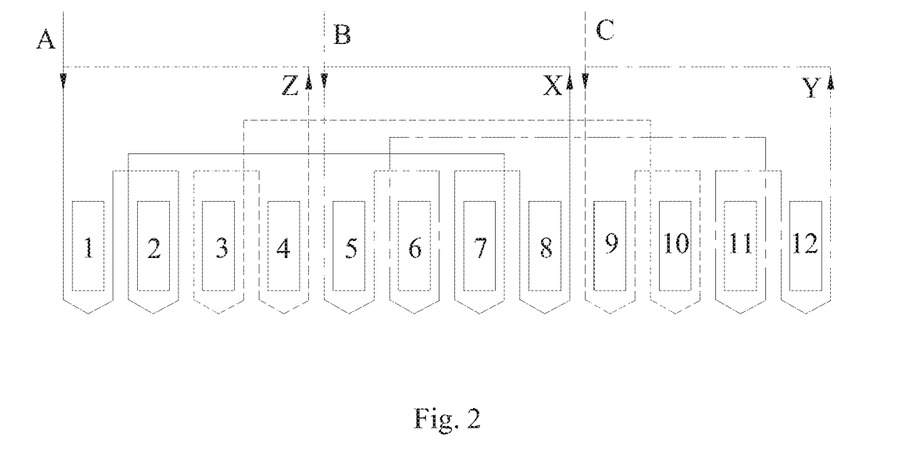
FIG. 2 is an expanded view of the winding of the motor of FIG. 1.
Figure 3:
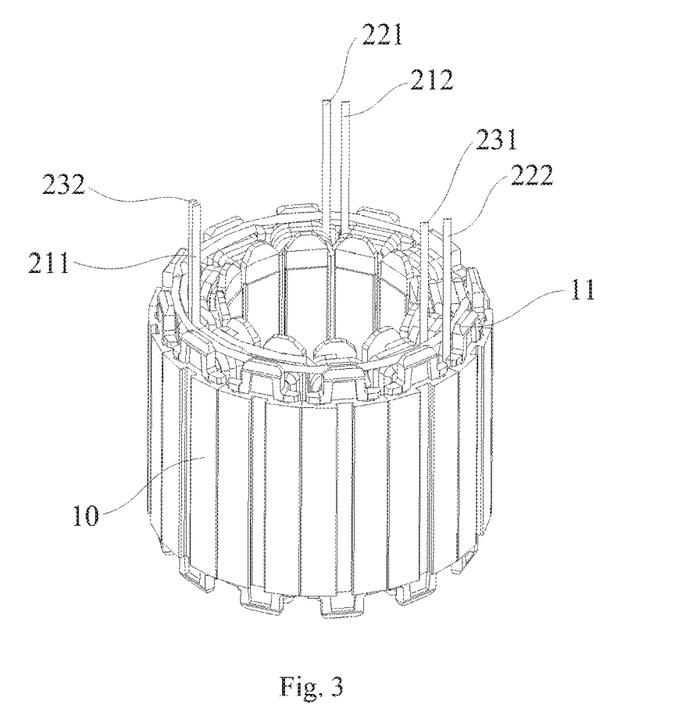
FIG. 3 illustrates a schematic view of a stator of a brushless motor in accordance with a first embodiment of the present invention.
Figure 4:
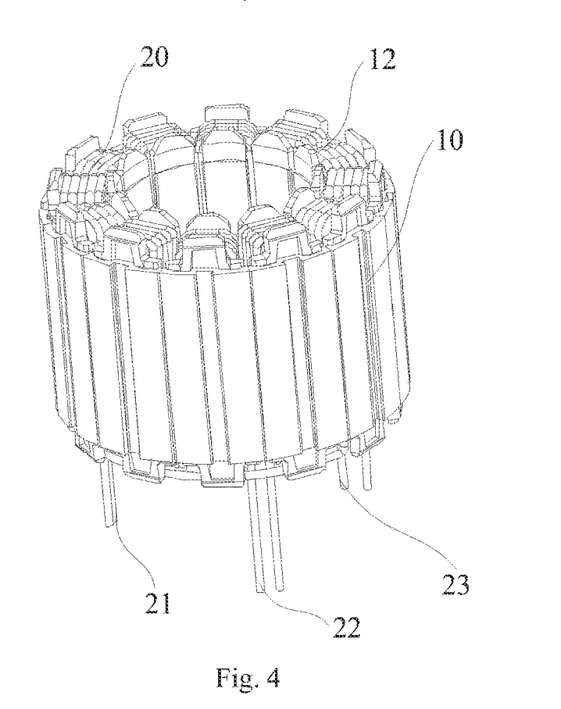
FIG. 4 is similar to FIG. 3, but viewed in another aspect.

FIG. 1 shows a winding schematic diagram of a 12-slot 14-pole brushless motor with a triangular winding arrangement. FIG. 2 shows an expanded view of FIG. 1. In FIGS. 1 and 2, A represents the first terminal, Z represents the sixth terminal, B represents the third terminal, X represents the second terminal, C represents the fifth winding terminal, Y represents the fourth terminal, S1~S12 represent the first to the twelfth winding slot respectively and W1~W12 represent the first to the twelfth coils respectively. The windings comprises three phases of windings. The A-X phase of winding comprises coils W1, W2, W7 and W8 which extend through the winding slots S1, S2, S3, S2, S8, S7, S8 and S9 in sequence. The B-Y phase of winding comprises coils W5, W6, W11 and W12 W5 which extend through the winding slots S5, S6, 57, S6, S12, S11, S12 and S1 in sequence. The C-Z phase of winding comprises coils W9, W10, W3 and W4 which extend through the winding slots S9, S10, S11, S10, S3, S2, S3 and S4 in sequence.

However, this kind of conventional winding method has the following drawbacks:

All terminals are located at different winding slots which results in complicated bridge wires connected between the terminals. The terminals and the bridge wires easily wear with each other which results in the risk of short circuit between turns of coils.

The terminals B, C, Z are located inside of the bridge wires and need to be moved manually to the outside of the bridge wires before being connected to a power source, which is inefficient. Furthermore, the bridge wires are easily scratched when extending the terminals through the winding slots, causing short circuit between turns of coils.

SUMMARY

Therefore, it is important to provide an improved winding structure for a brushless motor which overcomes the above problem.

In one aspect, the present invention provides a stator of a brushless motor which comprises a stator core comprising a plurality of teeth arranged in a circumferential direction thereof, a slot being formed between any adjacent two teeth; and a plurality of phases of windings wound on the teeth and received in corresponding slots, each phase of winding comprising two leading terminals, adjacent leading terminals of any adjacent two phases of windings extending into or out of the same slot.

Preferably, all leading terminals of the plurality of phases of windings are located at the same side of the stator core.

Preferably, each phase of winding further comprises a bridge wire located outside of the slots, a coil unit connected between one of the two leading terminals and an end of the bridge wire, and another coil unit connected between the other of the two leading terminals and the other end of the bridge wire.

Preferably, all of the leading terminals and the bridge wire are located at the same axial end of the stator core.

Preferably, the leading terminals are located at an axial end of the stator core, and the bridge wires are located at an opposite axial end of the stator core.

Preferably, the stator core comprises twelve teeth and twelve slots arranged alternately in the circumferential direction thereof, each of the coil units comprising two coils wound on two adjacent teeth respectively.

Preferably, the plurality of phases of windings comprises a first phase of winding, a second phase of winding and a third phase of winding which are connected as a triangle.

Preferably, the first phase winding comprises a first leading terminal and a second leading terminal, the second phase winding comprises a third leading terminal and a fourth leading terminal, the third phase winding comprises a fifth leading terminal and a sixth leading terminal, the first and the sixth leading terminals extending into and out of a first same slot respectively, the second and the third leading terminals extending into and out of a second same slot respectively, and the fourth and the fifth leading terminals extending into and out of a third same slot respectively.

In another aspect, the present invention further provides a brushless motor comprising a rotor and a stator. The stator comprises a stator core comprising a plurality of teeth arranged in a circumferential direction thereof, a slot being formed between any adjacent two teeth; and a plurality of phases of windings wound on the teeth and received in corresponding slots, each phase of winding comprising two leading terminals, adjacent leading terminals of any adjacent two phases of windings extending into or out of the same slot.

DETAILED DESCRIPTION OF THE PREFERRED EMBODIMENTS

Below, embodiments of the present invention will be described in greater detail with reference to the drawings to enable a person skilled in the art to understand the prevention. It should be noted, without the premise of conflict, the following description of each embodiment may be arbitrarily combined between features or between the technology to form a new embodiment.

Embodiment I

Referring to FIGS. 3-11, a stator of a brushless motor in accordance with a first embodiment of the present invention comprises a stator core 10 and stator windings 20 wound on the stator core 10. The stator core 10 comprises a plurality of circumferentially spaced teeth 11 and slots 12 formed between any two adjacent teeth 11. The stator windings 20 comprise a plurality of phases of windings A-X, B-Y and C-Z and each phase of winding comprises a plurality of coils W1~W6 each wound on the corresponding tooth 11 and received in the corresponding slots 12. Each phase of winding further includes two leading terminals 211 and 212, 221 and 222, or 231 and 232 located outside of the stator core 10 and configured for connecting with a power supply circuit of the motor. Two adjacent leading terminals of two adjacent phases of windings extend into and out from the same slot 12, which simplifies the winding structure of the stator windings 20 and improves the winding process capability and efficiency.

In this embodiment, the stator windings include a first phase of winding 21, a second phase of winding 22 and a third phase of winding 23. The first phase of winding 21 comprises a first leading terminal 211 and a second leading terminal 212. The second phase of winding 22 comprises a third leading terminal 221 and a fourth leading terminal 222. The third phase of winding 23 comprises a fifth leading terminal 231 and a sixth leading terminal 232. The first to the sixth leading terminals 211~232 are all exposed from the same axial end of the stator core 10. The first leading terminal 211 and the sixth leading terminal 232 extend into and out from the same slot 12 respectively, the second leading terminal 212 and the third leading terminal 221 extend into and out from the same slot 12 respectively, and the fourth leading terminal 222 and the fifth leading terminal 231 extend into and out from the same slot 12 respectively.

Figure 5:
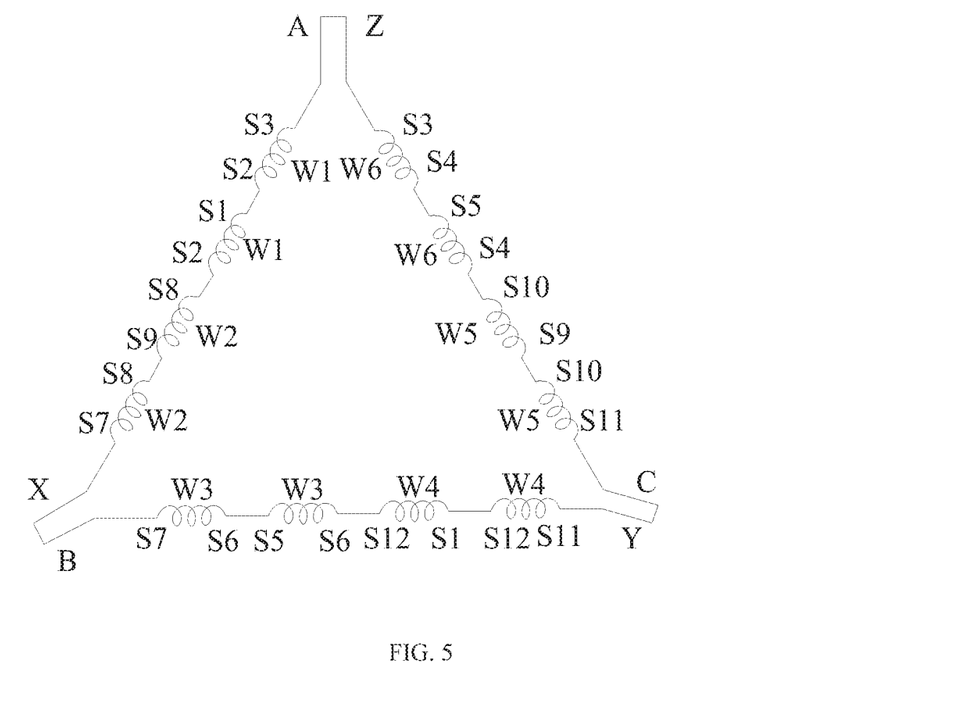
FIG. 5 illustrates a winding schematic diagram of the stator of the brushless motor of the first embodiment of the present invention.

In the embodiment of the present invention, the first phase winding 21 further comprises a first bridge wire 213 crossing over a plurality of teeth 11, a first coil unit 214 wound on connected between the first leading terminal 211 and the first bridge wire 213, and a second coil unit 215 connected between the second leading terminal 212 and the first bridge wire 213. The second phase winding 22 further comprises a second bridge 223 crossing over a plurality of teeth 11, a third coil unit 224 connected between the third leading terminal 221 and the second bridge wire 223, and a fourth coil unit 225 connected between the fourth leading terminal 222 and the second bridge wire 223. The third phase winding 23 further comprises a third bridge 233 crossing over a plurality of teeth 11, a fifth coil unit 234 connected between the fifth leading terminal 232 and the third bridge wire 233, and a sixth coil unit 235 connected between the sixth leading terminal 232 and the third bridge wire 233. As shown in FIG. 5, W1 represents the first coil unit 214, W2 represents the second coil unit 215, W3 represents the third coil unit 224, W4 represents the fourth coil unit 225, W5 represents the fifth coil unit 234, and W6 represents the sixth coil unit 235. In the stator of the brushless motor of the present embodiment, only three bridge wires 213, 223 and 233 are needed. Thus, the stator has a simple winding structure which can be easily formed by winding a single conductive wire uninterruptedly on the stator teeth, which simplifies the winding structure of the stator and reduces the risk of short circuit between turns of coils.

Figure 6:
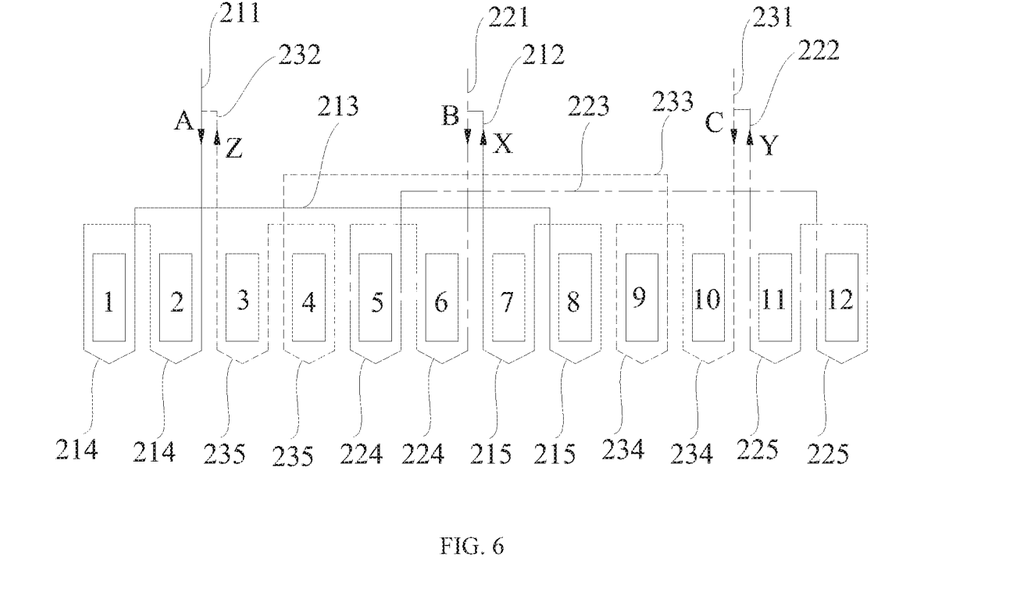
FIG. 6 is an expanded view of the windings of the stator of the brushless motor of the first embodiment of the present invention.
Figure 7:
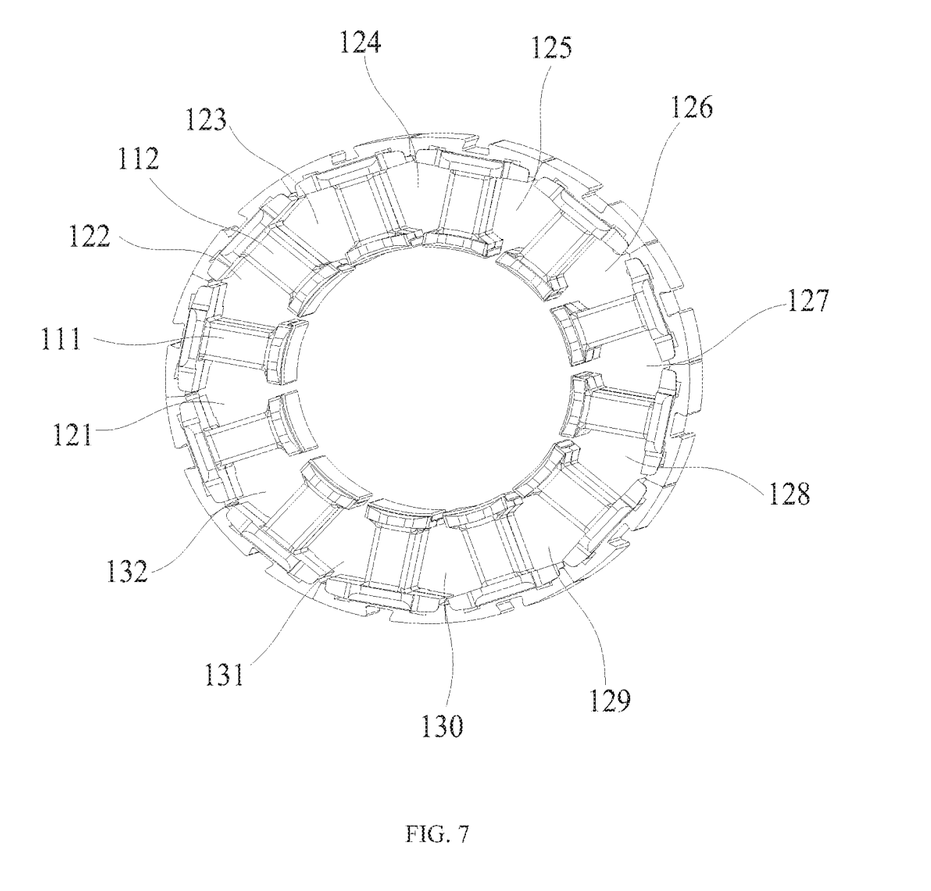
FIG. 7 illustrates a stator core of the brushless motor of the first embodiment of the present invention.
Figure 8:
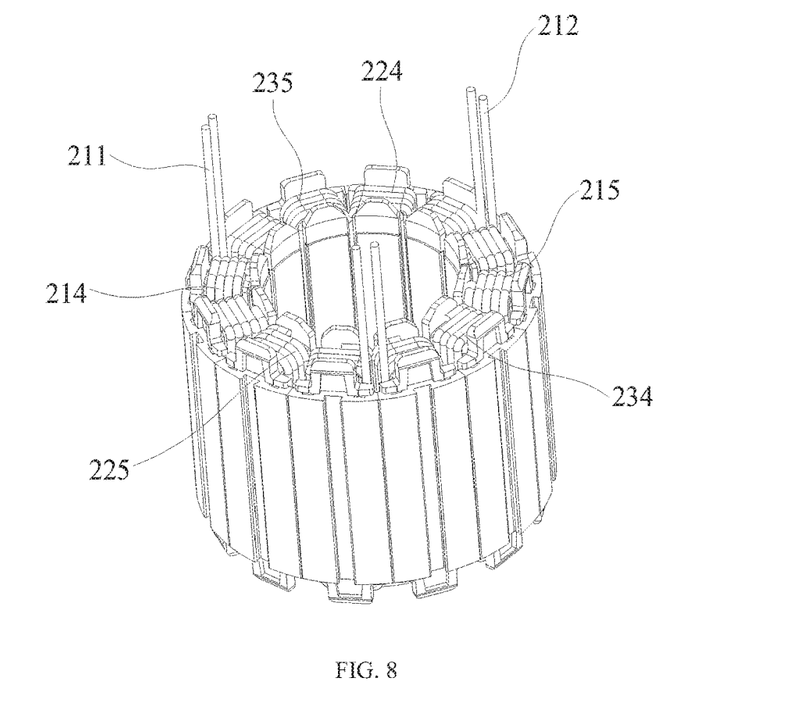
FIG. 8 illustrates a stator of a brushless motor in accordance with a second embodiment of the present invention.
Figure 9:
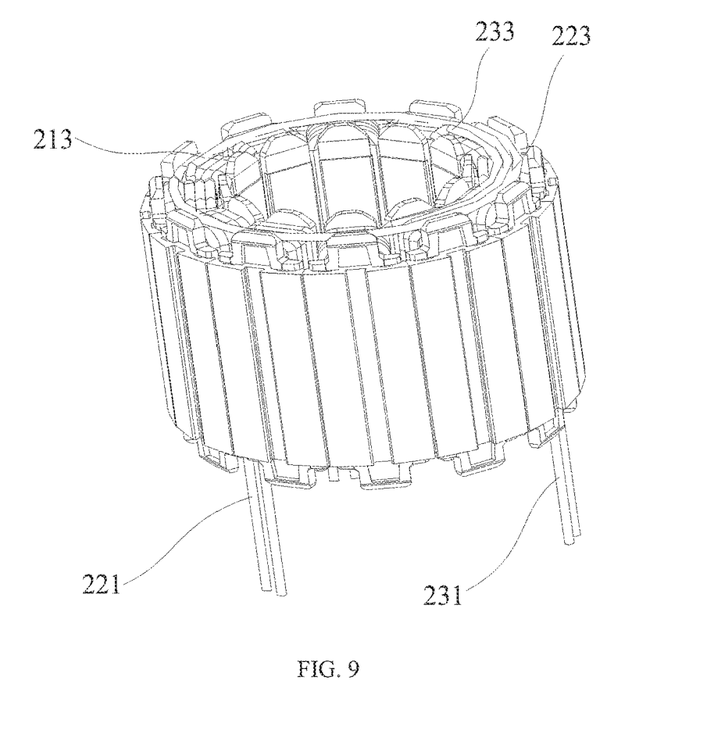
FIG. 9 is similar to FIG. 8, but viewed in another aspect.

As shown in FIG. 6, A represents the first leading terminal 211, Z represents the sixth leading terminal 211, B represents the third leading terminal 221, X represents the second leading terminal 212, C represents the fifth leading terminal 213, Y represents the fourth leading terminal 222. The first to the sixth leading terminals A~Z and the bridges wires 213~233 are located at the same axial end of the stator core. Each pair of adjacent leading terminals A, Z/B, X/C, Y comprises a leading in terminal A/BC and a leading out terminal Z/X/Y. The leading in terminal and the leading out terminal extend into and out of the same slot respectively. Thus, the connection between the leading terminals and the power supply circuit of the stator can be simplified and is more reliable. The risk of short circuit between turns of coils can be reduced.

In the present embodiment, the stator core comprises twelve teeth 11 and twelve slots 12 which are alternately arranged in the circumferential direction of the stator core. Each coil unit comprises two coils wound on two adjacent teeth 11. Thus, the first phase of winding A-X comprises two first coils 214 respectively wound on two adjacent teeth 11 and two second coils 215 respectively wound on two adjacent teeth 11. The second phase of winding B-Y comprises two third coils 216 respectively wound on two adjacent teeth 11 and two fourth coils 217 respectively wound on two adjacent teeth 11. The third phase of winding C-Z comprises two fifth coils 215 respectively wound on two adjacent teeth 11 and two sixth coils 235 respectively wound on two adjacent teeth 11.

Figure 10:
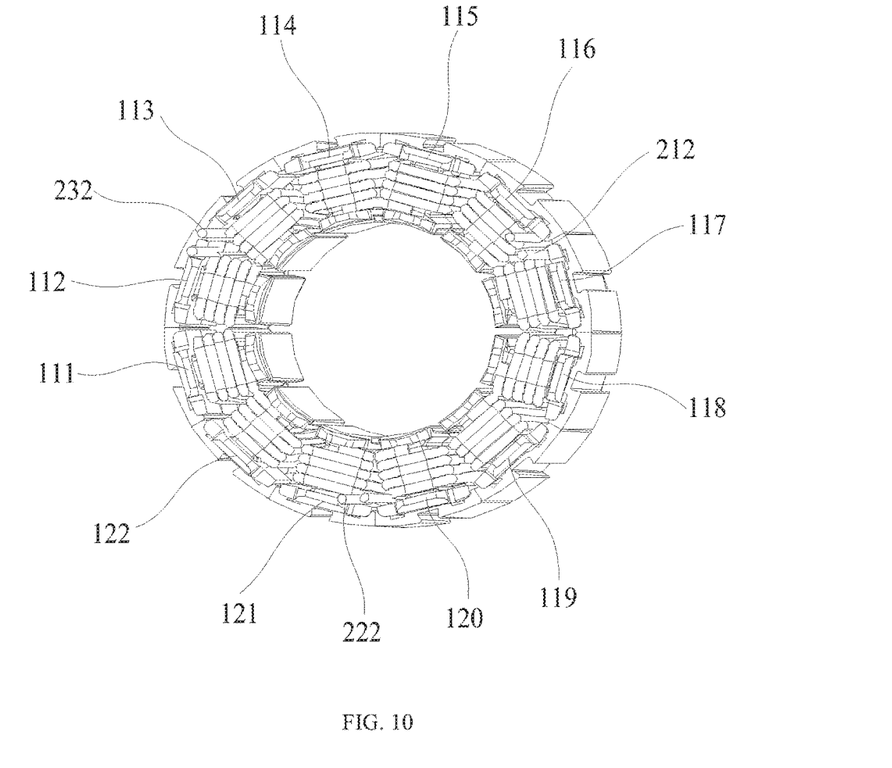
FIG. 10 illustrates the stator of the brushless motor in accordance with the second embodiment of the present invention, viewed in a third aspect.

Specifically, as shown in FIG. 10, the teeth 11 comprises the first to twelfth tooth 111 to 122 which are arranged in the circumferential direction of the stator core. The two first coils 214 are respectively wound on the first tooth 111 and the second tooth 112. The two second coils 215 are respectively wound on the seventh tooth 117 and the eighth tooth 118. The two third coils 224 are respectively wound on the fifth tooth 115 and the sixth tooth 116. The two fourth coils 225 are respectively wound on the eleventh tooth 121 and the twelfth tooth 122. The two fifth coils 234 are respectively wound on the ninth tooth 119 and the tenth tooth 120. The two sixth coils 235 are respectively wound on the third tooth 113 and the fourth tooth 114.

Figure 11:
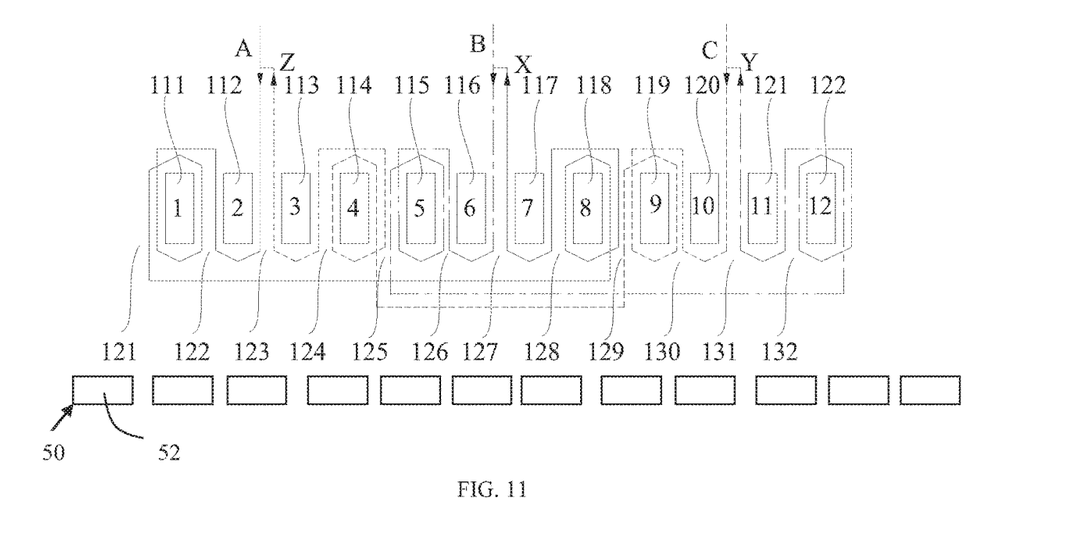
FIG. 11 is an expanded view of the windings of the stator of the brushless motor of the second embodiment of the present invention.

As shown in FIG. 11, the slots 12 include the first slot 121 located between the first tooth 111 and the twelfth tooth 122, the second slot 122 located between the first tooth 111 and the second tooth 112, the third slot 123 located between the second tooth 112 and the third tooth 113, the fourth slot 124 located between the third tooth 113 and the fourth tooth 114, the fifth slot 125 located between the fourth tooth 114 and the fifth tooth 115, the sixth slot 126 located between the fifth tooth 115 and the sixth tooth 116, the seventh slot 127 located between the sixth tooth 116 and the seventh tooth 117, the eighth slot 128 located between the seventh tooth 117 and the eighth tooth 118, the ninth slot 129 located between the eighth tooth 118 and the ninth tooth 119, the tenth slot 130 located between the ninth tooth 119 and the tenth tooth 120, the eleventh slot 131 located between the tenth tooth 120 and the eleventh tooth 121, and the twelfth slot 132 located between the eleventh tooth 121 and the twelfth tooth 122. As shown in FIG. 5, S1~S12 represent the first to the twelfth slots 121~132 respectively. The first leading terminal 211 extending into the third slot 123 and the sixth leading terminal 232 extending out of the third slot 123 both expose outside of the stator core 10, the second leading terminal 212 extending into the seventh slot 127 and the third leading terminal 221 extending out of the seventh slot 127 both expose outside of the stator core 10, the fourth leading terminal 222 extending into the eleventh slot 131 and the fifth leading terminal 231 extending out of the eleventh slot 131 both expose outside of the stator core 10. Thus, the leading terminals are capable of connecting to an external power supply circuit without needing to manually move the leading terminals to the outside.

An end of the first bridge wire 213 is connected to one end of the first coil 214 wound on the first tooth 111 and the other end of the bridge wire 213 is connected to the second coil 215 wound on the eighth teeth 118. An end of the second bridge wire 223 is connected to one end of the fifth coil 115 wound on the third tooth 224 and the other end of the second bridge wire 223 is connected to the fourth coil 225 wound on the twelfth tooth 122. An end of the third bridge wire 233 is connected to one end of the fifth coil 234 wound on the ninth tooth 119 and the other end of the third bridge wire 233 is connected to the sixth coil 235 wound on the fourth tooth 114. The structure of the bridge wires is simplified, which can reduce the risk of wear between wires.

The first leading terminals 211, the third leading terminals 231 and the fifth leading terminals 231 are leading in terminals of the stator and the second leading terminals 212, the fourth leading terminals 222 and the sixth leading terminal 232 are leading out terminals of the stator. The leading in terminals and the leading out terminals are configured to connect with the power supply circuit of the motor to thereby supply power to the windings of the stator.

Embodiment II

FIGS. 8-11 illustrate a stator of a brushless motor in accordance with a second embodiment of the present invention. The stator of the second embodiment has a stator core which is the same as the stator of the first embodiment and a winding structure which differs from the winding structure of the first embodiment. In the second embodiment, the first to the sixth leading terminals 211~232 are located at one axial end of the stator core. The first to the third bridge wireless 213~233 are located at an opposite axial end of the stator core. Thus, the leading terminals 211~232 and the bridge wires 213~233 are located at two opposite axial ends of the stator core respectively, which avoids mutual influence between the leading terminals 211~232 and the bridge wires 213~233 and avoid the risk of manually threading the wires. Furthermore, it is convenient to increase or reduce half turn of coil, thereby increasing the flexibility of adjusting the number of turns of the coils of the winding.

The present invention also discloses a brushless motor which comprises a stator disclosed above and a rotor 50 rotatable with respect to the stator. The rotor 50 includes a plurality of rotor poles 52, with the number of the rotor poles 52 near the number of the stator teeth 11. Preferably, the absolute value of the difference between the number of the rotor poles 52 and the stator teeth 11 is less than or equal to 2, the number of the rotor poles 52 being an even number. Preferably, the rotor poles 52 are permanent magnet poles.

Preferably, the motor comprises twelve slots and fourteen rotor poles. The windings comprise three phases of windings which are connected as a triangle. Adjacent two leading terminals of adjacent two phases of windings extend into or out of the same slot. Specifically, the leading terminals A and Z extend into and out of the same slot, the leading terminals B and X extend into and out of the same slot, and the leading terminals C and Y extend into and out of the same slot. The first phase of winding A-X comprises two coil units W1 and W2 and a bridge wire connected between the coil unit W1 and the coil unit W2. The coil unit W1 comprises two coils wound on the teeth 111 and 112 respectively. The coil unit W2 comprises two coils wound on the teeth 117 and 118 respectively. The second phase of winding B-Y comprises two coil units W3 and W4 and a bridge wire connected between the coil unit W3 and the coil unit W4. The coil unit W3 comprises two coils wound on the teeth 116 and 115 respectively. The coil unit W4 comprises two coils wound on the teeth 122 and 121 respectively. The third phase of winding C-Z comprises two coil units W5 and W6 and a bridge wire connected between the coil unit W5 and the coil unit W6. The coil unit W5 comprises two coils wound on the teeth 120 and 119 respectively. The coil unit W2 comprises two coils wound on the teeth 114 and 113 respectively.

The winding of the stator of the brushless motor of the present disclosure has the following advantages:

Adjacent leading terminals of any adjacent two phases of windings extend out of the same slot, which simplifies the winding structure of the stator winding and reduces the short circuit risk between turns of coils.

When the leading terminals 211~232 and the bridge wires 213~233 are located at two opposite axial ends of the stator core respectively, cross-talk between the leading terminals 211~232 and the bridge wires 213~233 can be avoided and the risk of manually threading the wires is reduced. Furthermore, it is convenient to increase or reduce half turn of coil, thereby increasing the flexibility of adjusting the number of turns of the coils of the winding.

All coils and bridge wires of the windings can be formed by winding a single conductive wire uninterruptedly on the stator teeth. It is easily automated.

The winding is not only suitable for the motor with twelve slots and fourteen rotor poles, but also suitable for the motor with twelve slots and ten rotor poles.

In the above-discussed embodiments, each coil is wound on a single tooth. Alternatively, in other embodiments, each coil may also be wound on a plurality of teeth.

In the above-discussed embodiment, preferably, the out diameter of the stator is less than or equal to 100 mm.

Understandably, in other embodiments, the out diameter of the stator is greater than 100 mm.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

The invention claimed is:

1. A stator of a brushless motor, comprising:
a stator core comprising a plurality of teeth arranged in a circumferential direction thereof, a slot being formed between any adjacent two teeth; and
a plurality of phases of windings wound on the teeth and received in corresponding slots, each phase of winding comprising two leading terminals, adjacent leading terminals of any adjacent two phases of windings extending into or out of the same slot,
wherein each phase of winding further comprises a bridge wire located outside of the slots, a coil unit connected between one of the two leading terminals and an end of the bridge wire, and another coil unit connected between the other of the two leading terminals and the other end of the bridge wire;
wherein the plurality of phases of windings comprises a first phase of winding, a second phase of winding and a third phase of winding which are connected as a triangle;
wherein the stator core comprises twelve teeth and twelve slots arranged alternately in the circumferential direction thereof, each of the coil units comprising two coils wound on two adjacent teeth respectively;
wherein the first phase winding comprises a first leading terminal and a second leading terminal, the second phase winding comprises a third leading terminal and a fourth leading terminal, the third phase winding comprises a fifth leading terminal and a sixth leading terminal, the first and the sixth leading terminals extending into and out of a first same slot respectively, the second and the third leading terminals extending into and out of a second same slot respectively, and the fourth and the fifth leading terminals extending into and out of a third same slot respectively;
wherein the twelve teeth comprises the first to the twelfth tooth, the plurality of phases of windings comprises the first to the sixth coil units each of which comprises two coils, two coils of the first coil unit wound on the first and second tooth respectively, two coils of the second coil unit wound on the seventh and eighth tooth respectively, two coils of the third coil unit wound on the fifth and sixth tooth respectively, two coils of the fourth coil unit wound on the eleventh and twelfth tooth respectively, two coils of the fifth coil unit wound on the ninth and tenth tooth respectively, and two coils of the sixth coil unit wound on the third and fourth tooth respectively; and
wherein the first leading terminal and the sixth leading terminal respectively extend into and out of one of the slots located between the second and third teeth, the second and third leading terminals respectively extend into and out of one of the slots located between the sixth and seventh teeth, and the fourth and the fifth leading terminals respectively extend into and out of one of the slots located between the tenth and eleventh teeth.

2. The stator of claim 1, wherein all leading terminals of the plurality of phases of windings are located at the same side of the stator core.

3. The stator of claim 1, wherein all of the leading terminals and the bridge wire are located at the same axial end of the stator core.

4. The stator of claim 1, wherein the leading terminals are located at an axial end of the stator core, and the bridge wires are located at an opposite axial end of the stator core.

5. A brushless motor comprising:
a rotor comprising a plurality of rotor poles; and
a stator comprising:
a stator core comprising a plurality of teeth arranged in a circumferential direction thereof, a slot being formed between any adjacent two teeth; and
a plurality of phases of windings wound on the teeth and received in corresponding slots, each phase of winding comprising two leading terminals, adjacent leading terminals of any adjacent two phases of windings extending into or out of the same slot,
wherein each phase of winding further comprises a bridge wire located outside of the slots, a coil unit connected between one of the two leading terminals and an end of the bridge wire, and another coil unit connected between the other of the two leading terminals and the other end of the bridge wire;
wherein the plurality of phases of windings comprises a first phase of winding, a second phase of winding and a third phase of winding which are connected as a triangle;
wherein the stator core comprises twelve teeth and twelve slots arranged alternately in the circumferential direction thereof, each of the coil units comprising two coils wound on two adjacent teeth respectively;
wherein the first phase winding comprises a first leading terminal and a second leading terminal, the second phase winding comprises a third leading terminal and a fourth leading terminal, the third phase winding comprises a fifth leading terminal and a sixth leading terminal, the first and the sixth leading terminals extending into and out of a first same slot respectively, the second and the third leading terminals extending into and out of a second same slot respectively, and the fourth and the fifth leading terminals extending into and out of a third same slot respectively;
wherein the twelve teeth comprises the first to the twelfth tooth, the plurality of phases of windings comprises the first to the sixth coil units each of which comprises two coils, two coils of the first coil unit wound on the first and second tooth respectively, two coils of the second coil unit wound on the seventh and eighth tooth respectively, two coils of the third coil unit wound on the fifth and sixth tooth respectively, two coils of the fourth coil unit wound on the eleventh and twelfth tooth respectively, two coils of the fifth coil unit wound on the ninth and tenth tooth respectively, and two coils of the sixth coil unit wound on the third and fourth tooth respectively; and
wherein the first leading terminal and the sixth leading terminal respectively extend into and out of one of the slots located between the second and third teeth, the second and third leading terminals respectively extend into and out of one of the slots located between the sixth and seventh teeth, and the fourth and the fifth leading terminals respectively extend into and out of one of the slots located between the tenth and eleventh teeth.

6. The motor of claim 5, wherein all leading terminals of the plurality of phases of windings are located at the same side of the stator core.

7. The motor of claim 6, wherein each phase of winding further comprises a bridge wire located outside of the slots, a coil unit connected between one of the two leading terminals and an end of the bridge wire, and another coil unit connected between the other of the two leading terminals and the other end of the bridge wire.

8. The motor of claim 7, wherein all of the leading terminals and the bridge wire are located at the same axial end of the stator core.

9. The motor of claim 7, wherein the leading terminals are located at an axial end of the stator core, and the bridge wires are located at an opposite axial end of the stator core.

10. The motor of claim 5, wherein the absolute value of the difference between the number of the rotor poles and the teeth of the stator is less than or equal to 2.

11. The motor of claim 10, wherein the stator comprises twelve slots and the rotor comprises ten rotor poles or fourteen rotor poles.

\* \* \* \* \*